Jan. 12, 1932.  P. BOROWSKY  1,840,692
STATION INDICATOR
Filed Sept. 17, 1928   7 Sheets-Sheet 3

INVENTOR.
Peter Borowsky.
BY
ATTORNEY.

Jan. 12, 1932.  P. BOROWSKY  1,840,692
STATION INDICATOR
Filed Sept. 17, 1928   7 Sheets-Sheet 7

INVENTOR.
Peter Borowsky
BY
Thos S Donnelly
ATTORNEY.

Patented Jan. 12, 1932

1,840,692

UNITED STATES PATENT OFFICE

PETER BOROWSKY, OF DETROIT, MICHIGAN, ASSIGNOR OF ONE-NINTH TO AMBROSE MULDOON, ONE-NINTH TO THOS. J. STANTON, ONE-NINTH TO THOMAS MULDOON, AND ONE-NINTH TO WILLIAM CURLEY, ALL OF DETROIT, MICHIGAN, AND ONE-NINTH TO MICHAEL MULDOON, OF HIGHLAND PARK, MICHIGAN

STATION INDICATOR

Application filed September 17, 1928. Serial No. 306,519.

My invention relates to a new and useful improvement in a station indicator and advertising machine adapted for use primarily on traveling vehicles and particularly public conveyances such as street cars, railroad trains, busses, etc., although from the description given it will be evident that some of the structure illustrated may be used on stationary display devices as well.

It is an object of the present invention to provide a stationary indicator and advertising display mechanism which will be automatically operated so as to display successively at predetermined times specific display matter.

It is another object of the invention to provide a novel mechanism for feeding a flexible display element so as to properly bring the matter to be displayed in alignment with the display space at predetermined times.

It is another object of the present invention to provide a device of this kind which will be economical of manufacture, durable and highly efficient in use.

Other objects will appear hereinafter.

The invention consists in the combination and arrangement of parts hereinafter described and claimed.

The invention will be best understood by a reference to the accompanying drawings which form a part of this specification, and in which.

Figure 1:
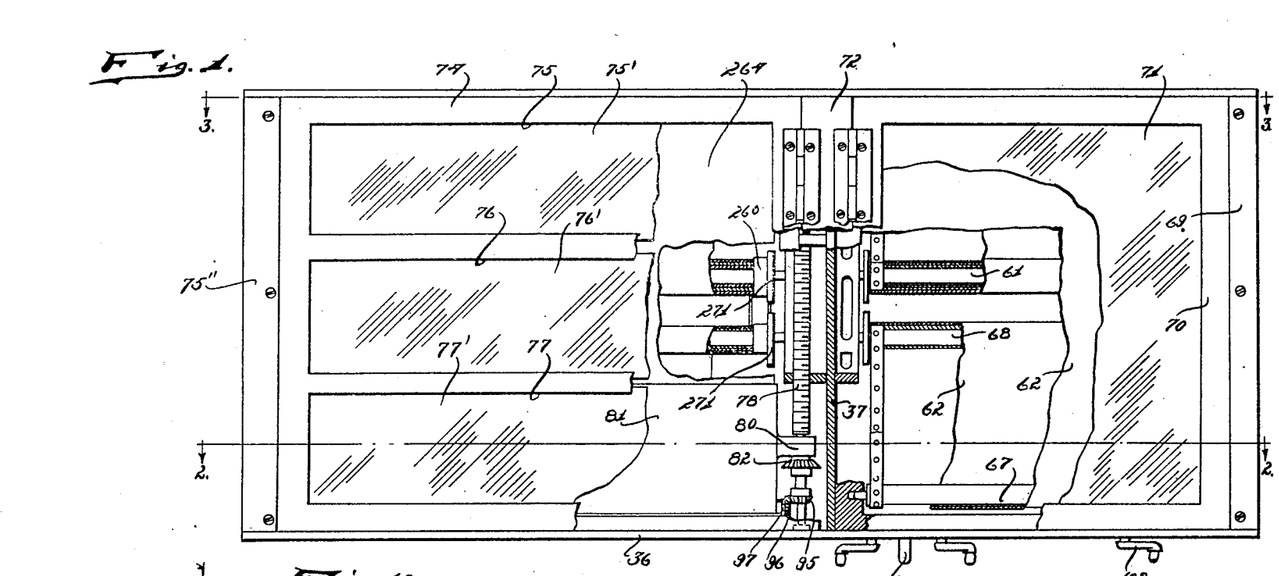
Fig. 1 is a front elevational view of the invention, with parts broken away and parts shown in section.
Figure 2:
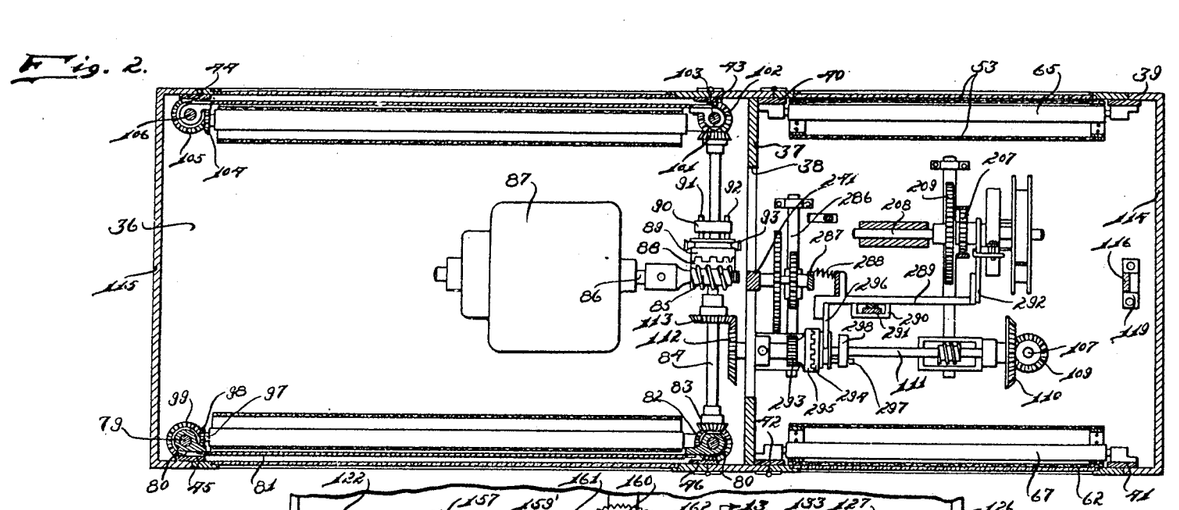
Fig. 2 is a sectional view taken on line 2—2 of Fig. 1.

In the exemplification of the invention as shown in the drawings I have enclosed the invention in a housing, having a base 36. Projecting upwardly from this base so as to divide the housing into a pair of compartments is a partition 37. Secured to and projecting upwardly from the base 36 are standards 39, 40, 41 and 42, the partition 37 being cut away as at 38. (See Fig. 2.) Standards 43, 44, 45 and 46 are also secured to and project upwardly from the base 36. Extending longitudinally of the housing at one side of the partition 37 is a bar 47, a small bar 48 being extended at the opposite side of the housing. The bar 47 is provided with bearings 49 and 50 in which is rotatably mounted a shaft 52 of a roller 51 over which is adapted to be wound the flexible apron 53, on which advertising or other indicating media may be displayed. A roller 54 is journaled in bearings 55, the apron 53 being wound on the roller 54. (See Fig. 3.) A suitable support 56 serves to retain the bearings 55 in position. A shaft 59 is rotatably mounted in bearings 58 and fixed on the shaft 59 is a roller 60 over which the apron 62 is adapted to pass, the apron 62 being wound on the roller 61, this roller 61 being fixedly mounted on the shaft 61', a bearing 64 being also provided for the shaft 59. At the lower side of the housing there is also provided a roller 65 over which the flexible apron 53 is adapted to be passed, the other end of this apron being secured to and wound upon the roller 66. A similar roller 67 at the bottom of the housing affords a bearing for the apron 62 which is passed therearound, and which is wound at its opposite end upon the roller 68, which is fixedly mounted on the shaft 68'. The housing is provided with a frame, consisting of the end rail 69 and a door frame 70 in which is mounted a transparent closure 71, this door frame being swingably attached to the central ribbing 72 which extends outwardly from the base 36. A door 74 is provided with a plurality of openings 75, 76 and 77, each of which is closed by the transparent closures 75', 76' and 77' respectively, the edge of this door 74 engaging the end rail 75''. The door 74 is hingedly mounted on the central rib 72. Rotatably mounted on the base 36 and extending upwardly therefrom is a screw 78. Rotatably mounted on the screw 78 is a nut which projects outwardly from and is secured to the shield 81, the construction being such that upon a rotation of the screw 78 in one direction the shield 81 will be elevated behind the transparent closures of the door 74 so as to conceal the apron which may be passing behind. A rotation of this screw 78 in the other direction will serve to move the shield 81 in the opposite direction. Fixedly mounted on the screw 78 is a beveled gear 82 meshing with the beveled gear 83, which is fixedly mounted on the shaft 84. A worm 85 is fixedly mounted on the shaft 86 of the electric motor 87. A clutch, comprising sections 88 and 89, is mounted on the shaft 84, the section 88 being rotatably mounted on the shaft 84, and the section 89 being slidable thereon. Projecting outwardly from one face of the section 89 are pins 91 and 92 which project through openings formed in a disk 90 which is fixedly mounted on the shaft 84. A clutch yoke 93 serves as a means for sliding the section 89 out of engagement or mesh with the section 88, this clutch being operable by a rocking of the rod 94 shown in Fig. 1. Beveled gear 95 is mounted on the member 78 and meshes with a beveled gear 96 which is mounted on the shaft 97. The shaft 84 is rotatable upon an operation of the motor through the engagement of the worm 85 with the gear 408. Mounted on the shaft 97 is a gear 98 which meshes with the gear 99 fixedly mounted on the shaft 79. A gear 101 fixedly mounted on the shaft 84 meshes with a gear 102 fixedly mounted on the shaft 103. A gear 104 meshes with a gear 105 which is fixedly mounted on the shaft 106. Projecting through the base 36 is a shaft 107 upon which is mounted below the base 36 a crank 108 for effecting a rotation of the shaft 107. Fixedly mounted on the shaft 107 is a gear 109 meshing with a beveled gear 110 which is fixedly mounted on the shaft 111 upon which is fixedly mounted a beveled gear 112 meshing with the beveled gear 113 fixedly mounted on the shaft 84. (See Fig. 2 and Fig. 1.)

Figure 11:
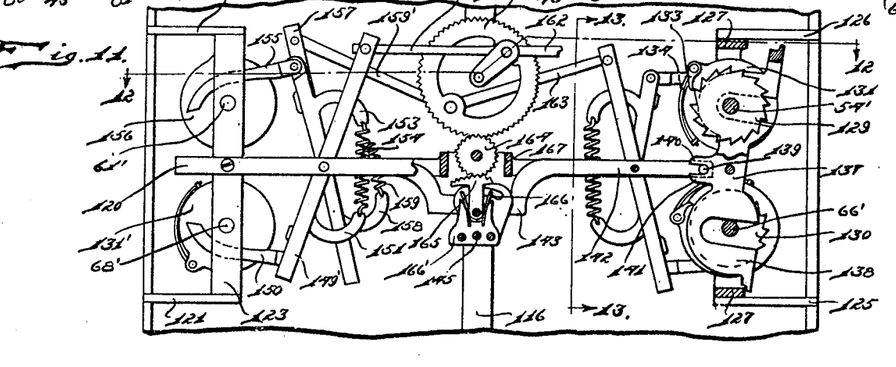
Fig. 11 is an enlarged view taken on line 11—11 of Fig. 6.
Figure 12:
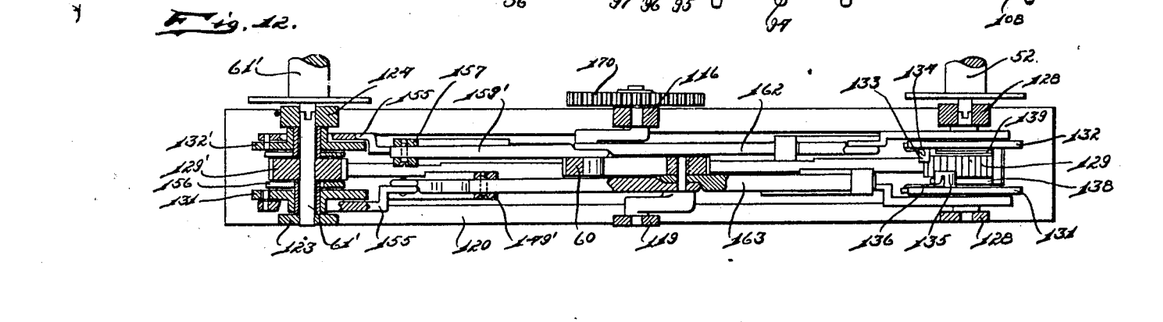
Fig. 12 is a sectional view taken on line 12—12 of Fig. 11.

An end wall 114 is secured on the housing and a similar end wall 115 is secured at the opposite end of the housing. Extending vertically over the base 36 in spaced relation to the end wall 114 is a plate 116 which is secured at its upper end to transversely extending plate 117. A U-shaped bracket is mounted between the plate 116 and the wall 114, this bracket having its legs 118 and 119 extended in horizontal position. The plate 116 is secured to a transversely extending bar 119'. (See Fig. 6.) Bracket arms 121 and 122 serve to support a vertically extending plate 123, to which is fastened an operating bar 120. (See Fig. 11.) The plate 120 is cut away as shown in Fig. 12, and projecting from this plate is a block 124. Bracket arms 125 and 126, cooperating with the horizontally extending plates 127, serve to support the upright 128. Journaled in the upright 128 is a shaft 54' upon which is mounted the ratchet wheel 129. A ratchet wheel 130 is mounted upon the shaft 66'. A disc 131 is in spaced relation to a disc 132, these discs being mounted on the shaft 54' loosely. Carried on the inner face of the disc 132 is a dog 133 normally retained by means of the spring 134 in engagement with the periphery of the ratchet wheel 129. A similar dog 135 is rockingly mounted on the disc 131 and normally maintained in engagement with the periphery of the ratchet wheel 129 by means of the spring 126. (See Figs. 11 and 12.) Rockingly mounted on a pin projected through the member 128 intermediate its ends is a bar 137 having its lower end 138 provided with a notch for reception of the shaft 66', as shown in Fig. 11. The upper end of this disc is of similar formation, and so arranged that upon a rocking in one direction the dogs which cooperate with the ratchet bar 129 may be moved to inoperative position, while the dogs, which are of similar structure to those already described, by cooperation with the rachet wheel 130 are moved to operative position, and a reverse rocking of the bar 137 will effect a reverse operation on the separate pairs of dogs. The yoke forming arms 140 and 141 embrace a pin 139 which is projected through the bar 142, this bar being offset as at 143. Projected through the offset portion 143 is a pin 147 (see Fig. 14) which extends through the arcuate slot 146 formed in the plate 144, which is rockingly mounted on the pin 145. The opposite end of the bar 148 is provided with a pin which extends outwardly over the bar 137' constructed and formed in the same manner as is the bar 137. The arm 149' is pivotally connected by means of the arm 150 to a disc 131', corresponding to the disc 131 and cooperating with a disc similar to the disc 132, a similar ratchet wheel being interposed between these discs, as clearly appears in Fig. 14 and Fig. 12. An arcuate arm 151 is connected to a spring 154, this spring being connected to the arcuate arm 153 which extends outwardly from arm 152, this arm 152 being connected by the arm 155 to the disc 156, constructed and arranged as are the discs 131 and 132 already described. The connection of the arm 155 to the disc 156 is eccentric, as is also the connection of the arm 150 with the disc 131'. An arm 157 is provided with the arcuate arm 158, to which is attached the spring 159. A pitman 159' connects the arm 157 eccentrically to the gear 160. A pitman 161 connects the arm 149' also eccentrically to the gear 160, and an arm 162 connects a similar mechanism, as shown in Fig. 11, which is located at the opposite end. A pitman 163 serves also to connect an arm corresponding to the arm 149' to the gear 160. Meshing with the gear 160 is a pinion 169. A pinion 164 also meshes with a segment 165 rockingly mounted between leaf springs 166, which are carried by the yoke plate 166', which is rockingly mounted on the shaft 145, this plate 166' being positioned in engagement with one face of the plate 144. Bars 167 extend parallel to the shaft 168 upon which the pinion 164 is mounted.

Figure 3:
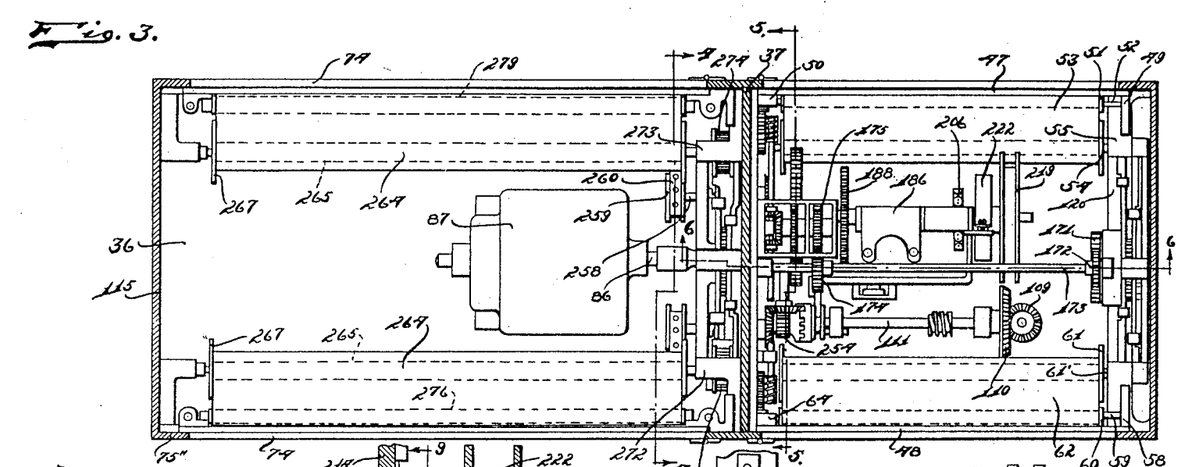
Fig. 3 is a sectional view taken on line 3—3 of Fig. 1.
Figure 4:
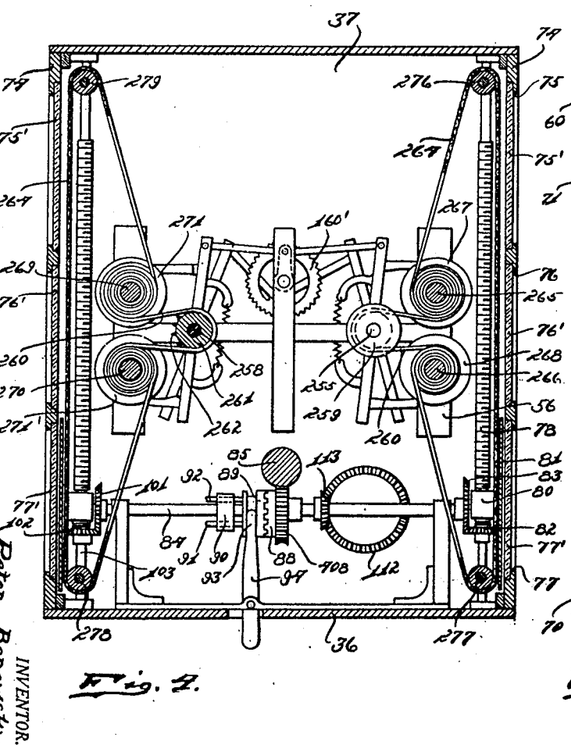
Fig. 4 is a sectional view taken on line 4—4 of Fig. 3.
Figure 6:
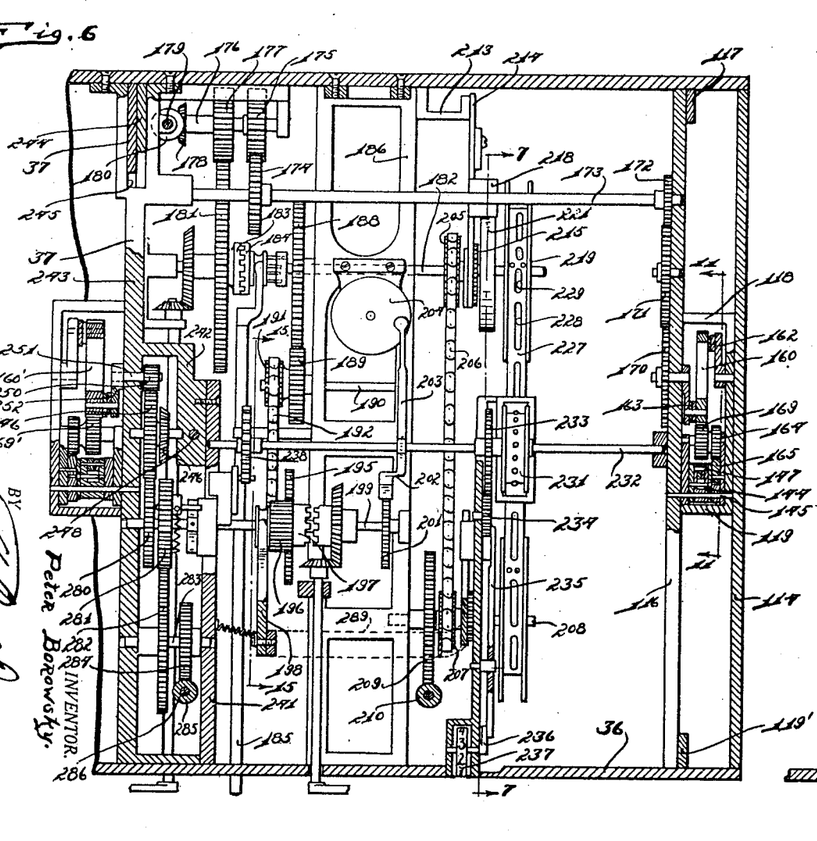
Fig. 6 is a sectional view taken on line 6—6 of Fig. 3.
Figure 7:
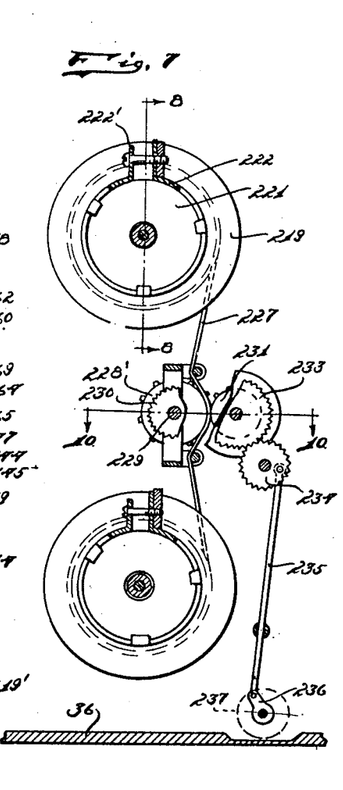
Fig. 7 is a sectional view taken on line 7—7 of Fig. 6.

The gear 160 is driven by its connections with the crank attached to the shaft upon which the gear 170 (see Fig. 6) is mounted. This gear 170 meshes with a gear 171, which in turn meshes with a gear 172 mounted on the shaft 173. A gear 174 mounted on the shaft 173 meshes with a gear 175, which is fixedly mounted on the shaft 176, and upon which also is mounted fixedly a gear 177. A pinion 178 is fixedly mounted on the shaft 176 and meshes with a pinion 180 mounted on the shaft 179. A gear 181 meshes with a gear 177, this gear 181 being mounted on the shaft 182 on which is mounted a clutch comprising the sections 183 and 184, this clutch being operated by a rocking of the arm 185. Connecting the bottom 36 to the top 37 of the housing is an upright 186, having its upper end angularly turned, as shown in Fig. 3. As shown in Fig. 6, mounted on the shaft 182 is a gear 188 which meshes with a gear 189, which is mounted on the shaft 190, journaled in the upright 186. A gear 191 is also mounted on the shaft 190 and connected by the chain 192 to the gear 193, which is mounted on the shaft 194. A gear 195 is adapted to mesh with the gear 196, which is controlled by the clutch 197, operable by the arm 198. The gear 196 is mounted on the shaft 199, and mounted on this shaft 199 is a gear 201 engaging with which is a detent 202 formed on the arm 203, which is rockingly mounted on the shaft 232. As the gear 201 rotates over the angularly turned end of the arm 202 of the arm 203 the upper end of this arm will be moved out of engagement with the bell 204. Mounted on the shaft 182 is a gear 205 connected by the belt 206 to the gear 207, which is mounted on the shaft 208. A gear 209 is also mounted on this shaft and adapted to mesh with a worm 210 on the shaft 412.

Projecting laterally from the support 186 is a bracket 213 which serves to support the arm 214 which supports the shaft 182. Mounted upon this shaft 182 is a gear 215 engaging with the periphery of which is the rockably mounted detent 216 normally held in vertical position by the spring 217, which is fixedly mounted at one end of the support 214. A disc 219 is mounted on the shaft 182 and provided with pins 220 which are adapted to project into openings formed in a disc 221 mounted within the brake drum 222. A disc 223 engages one face of the disc 221. Mounted on the disc 223 are a plurality of swingably mounted dogs 224 adapted to engage when swung outwardly the axially extending abutment bars 225. A pin 226 also projects outwardly from one face of the brake 221.

The disc or drum 219 is adapted for reception of a belt 227 which is provided with elongated slots 228 and narrower slots 229 formed therein. This belt is adapted to ride between sprocket drums 228' and 231, the drum 228' being mounted on the shaft 229 and driven by a gear 230. The sprocket gear 231 rotates in unison with a gear 233 which meshes with and drives the gear 234 which is connected eccentrically by the arm 235 to a crank 236 which serves to rotate a counting disc 237.

Figure 5:
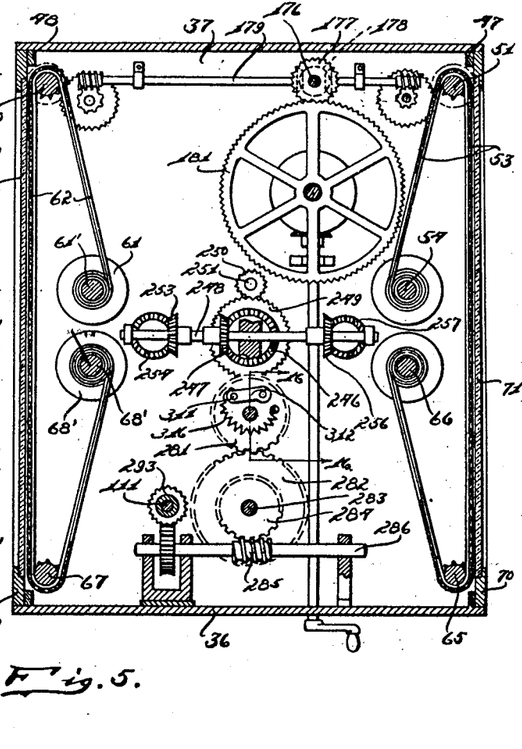
Fig. 5 is a sectional view taken on line 5—5 of Fig. 3.
Figures 13, 14, 15, 16, 17, 18, 19, 20:
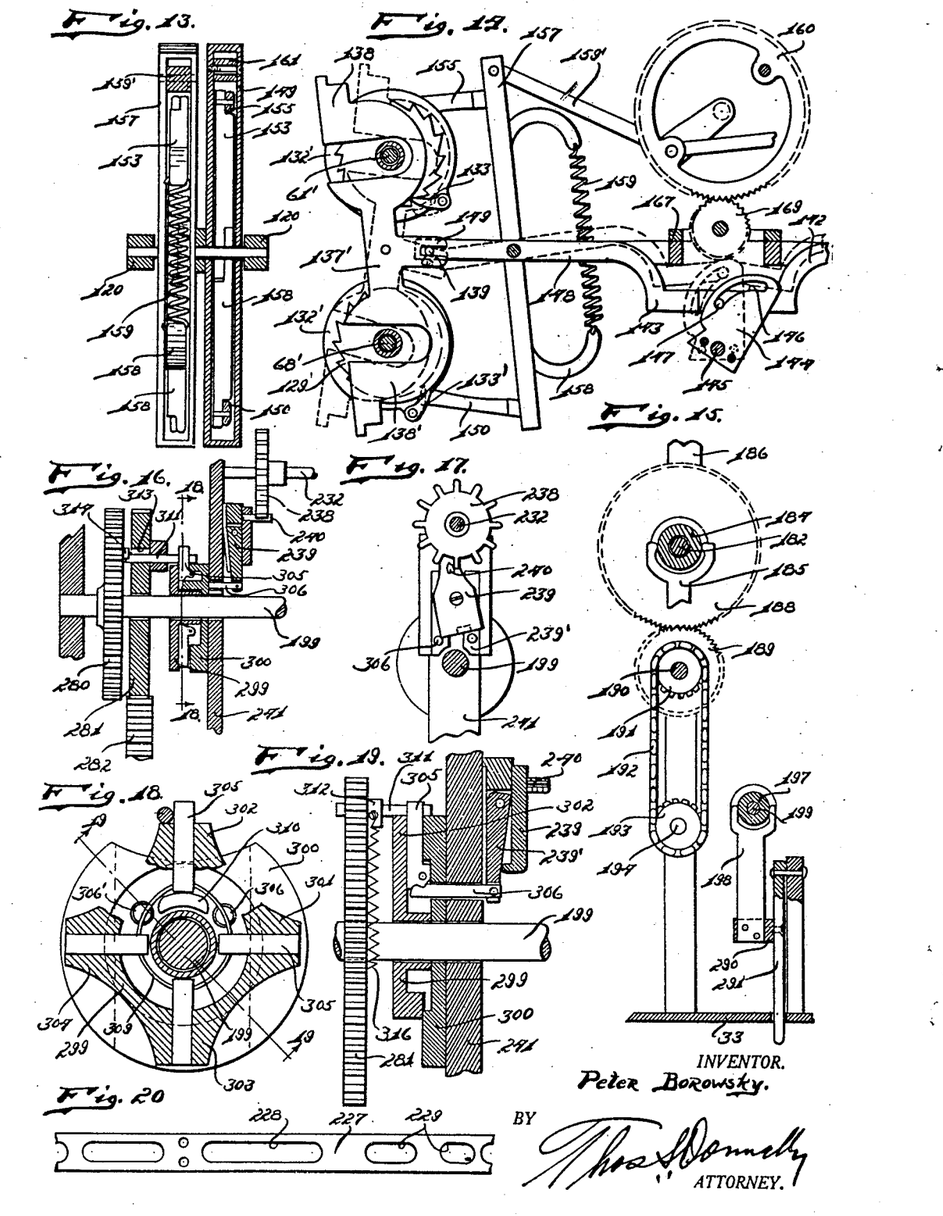
Fig. 13 is a sectional view taken on line 13—13 of Fig. 11.
Fig. 14 is a side elevational view of the feeding mechanism used in the invention.
Fig. 15 is a view taken on line 15—15 of Fig. 6.
Fig. 16 is a fragmentary sectional view taken on line 16—16 of Fig. 5.
Fig. 17 is an enlarged fragmentary front elevational view of the mechanism shown in Fig. 16.
Fig. 18 is a sectional view taken on line 18—18 of Fig. 16.
Fig. 19 is an enlarged sectional view taken on line 19—19 of Fig. 18.
Fig. 20 is a fragmentary perspective view of the belt used in the invention.
Figures 21, 22, 23, 24, 25, 26:
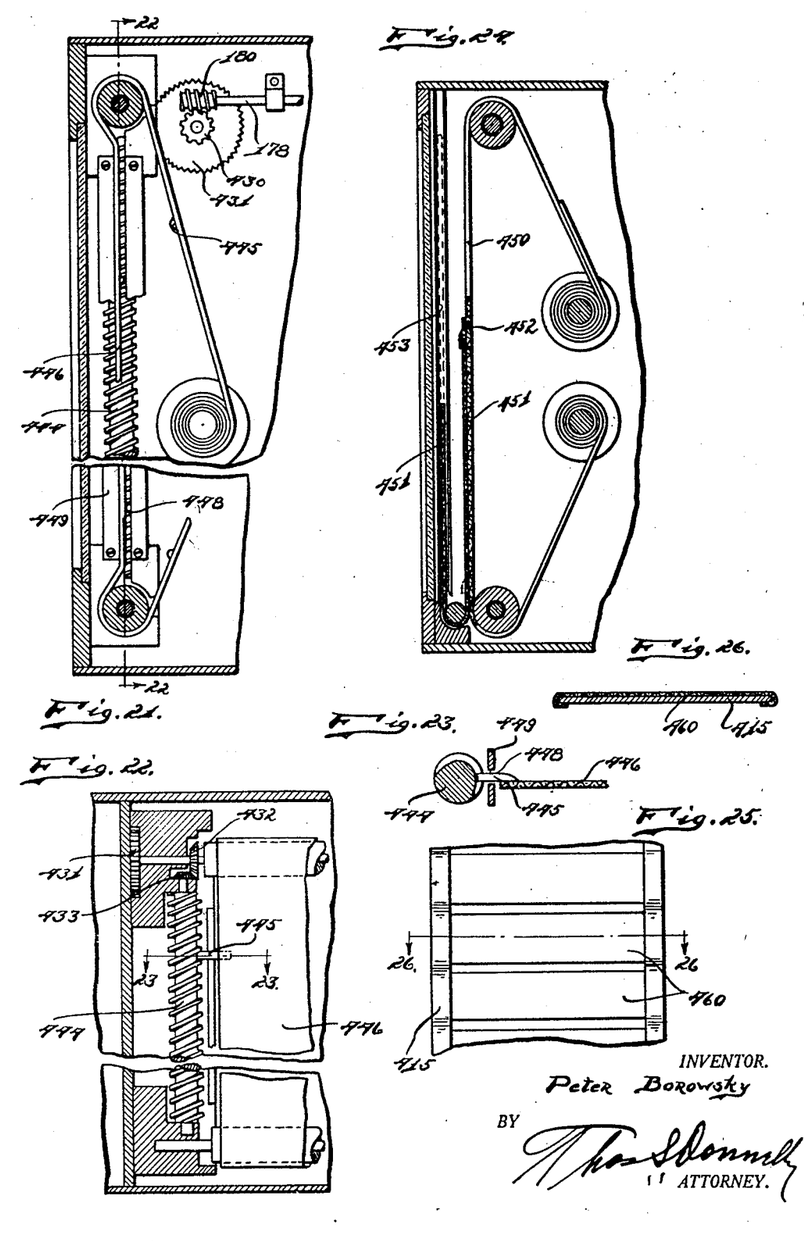
Fig. 21 is an enlarged modified fragmentary view of the form of the roller operating mechanism.
Fig. 22 is a sectional view taken on line 22—22 of Fig. 21.
Fig. 23 is a sectional view taken on line 23—23 of Fig. 22.
Fig. 24 is a fragmentary sectional view of a modified form of advertising medium used with the invention.
Fig. 25 is a fragmentary front elevational view of the indicating bearing medium.
Fig. 26 is a sectional view taken on line 26—26 of Fig. 25.

Mounted on the shaft 232 is a gear 238 engaging with the teeth of the periphery of which is a pin 240 which projects outwardly from the swingably mounted arm 239. A plate 241 extends upwardly from the base 36 and is secured at its upper end to a bracket 242 which extends outwardly and thence downwardly from the vertical support 243. This support 243 is provided at its upper end with a slot 245 for the reception of the transversely extending plates 27 and 244. Mounted rotatably in the bracket 242 is a pinion 246 (see Fig. 6) meshing with beveled gear 247 (see Fig. 5) which is mounted on the shaft 248. The gear 249 meshes with a gear 250 which is mounted on the shaft 251 and to which is attached a crank 252 eccentrically connected to the gear 160′, corresponding in its functions and operations to the gear 160 shown in Fig. 11. Meshing with a gear 160′ is a gear 169′ corresponding to the gear 169. The rest of the mechanism supported in the bracket illustrated at the left of Fig. 6 is as already explained, for the mechanism supported by the brackets 118 and 119. Fixedly mounted on the shaft 248 is a beveled gear 253 meshing with the beveled gear 254 mounted on the shaft 255. A beveled gear 256 is mounted on the shaft 248 and meshes with the gear 257 mounted on the shaft 258. Fixedly mounted on the shaft 258 is a reel 259 around which passes a tape 260, this reel being provided with a sprocket wheel 261 having teeth 262 for engaging in openings formed in the tape 260. A flexible display strip 264 is positioned at opposite sides of the housing, the operation and mechanism for operating the same being duplicated at each side of the housing. At one side this flexible strip 264 winds on the rollers 267 and 268, which are mounted on the shafts 265 and 266 respectively. At the opposite side the flexible strip 264 winds on the drums or reels 271 which are mounted on the shafts 269 and 270, suitable bearings 272 and 273, as shown in Fig. 3, being provided for supporting these rollers. Rachet wheels 275 and 274 are provided for effecting a rotation of the roller so that the movement of the flexible strips 264 may be effected, this mechanism as already described and clearly illustrated in Fig. 11. Guide rollers or idlers 276 and 277 are positioned at one side of the housing for engaging the flexible strip 264, and similar rollers 278 and 279 are positioned at the other side of the housing. Fixedly mounted on the shaft 199 is a gear 280. Loosely positioned on the shaft 199 is a gear 281 meshing with the gear 282, as shown in Fig. 16, this gear 282 being mounted on the shaft 283 upon which is mounted the gear 284 meshing with the worm 285, which is mounted on the shaft 286. A bar 287 is connected by the spring 288 to the arm 289, which is provided with the bracket 290 thereon, and in which engages the bar 291. The end of the arm 289 is turned upwardly and secured thereto is the arm 292. Mounted on the shaft 111 is a gear 293, the operation of which is controlled by a clutch comprising the sections 294 and 295. A depending yoke is secured to the angularly turned end of the arm 296 for effecting a slidable movement of the section 294 axially of the shaft 111 and fixedly mounted on the shaft 111 is a disc 298 through which extend slidable pins 297 projecting outwardly from one face of the clutch section 294. As shown in Fig. 16 and Fig. 18, there is mounted on the shaft 199 a disc 299 which faces a disc 300 on which are the projections 301, 302, 303 and 304, in each of which is slidably mounted the blade 305. Pins 306 and 306′ project through the disc, these pins being pivotally connected to the rockably mounted arm 239. Radially extending rockably mounted arms 306 are adapted for engaging the free end of the pins 305, these pins serving as cams. A spring 309 serves normally to retain the blades 305 turned inwardly, this spring being placed under strain as the blades ride over the cam 310 which extends over the face of the disc. A pin 311 projects through a block 312 and through the opening 313, and is adapted to engage the boss 314 which projects outwardly from the face of the gear 280.

In operation the rotation of the motor 87 will through the meshing of the worm 85 with the gear 408 while the clutch 89 is engaged with the clutch 88 cause the rotation of the shaft 84.

The gear 113 on the shaft 84 will mesh with the gear 112 on the shaft 111. The worm 293 on the shaft 111 will mesh with the gear 293′ and the worm 295 with the gear 282 and the gear 282 with the gear 281 which is mounted on the shaft 199. The gear 196 will mesh with the gear 195 and will cause the gear 193 to rotate the belt 192 around the gear 191 on the shaft 190, the gear 189 meshing with the gear 188 mounted on the shaft 182. A rotation of the shaft 173 takes place through the gears 187, 177, 174 and 175 thus causing a rotation of gear 171 which meshes with the gears 171 and 170. The gear 170 which is connected to the crank pin will rotate the gear 160. Connected to the gear 160 are pitmans 159′, 161, 162 and 163 which are connected to rockingly mounted arms 149′ and 157 on which are connected links which drive, through the dogs 133 to a ratchet wheel 129.

Figure 8:
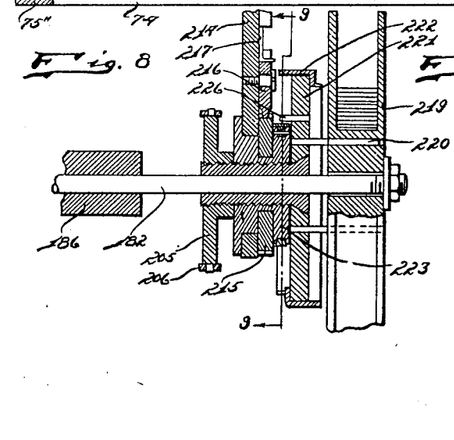
Fig. 8 is a sectional view taken on line 8—8 of Fig. 7.
Figures 9, 10:
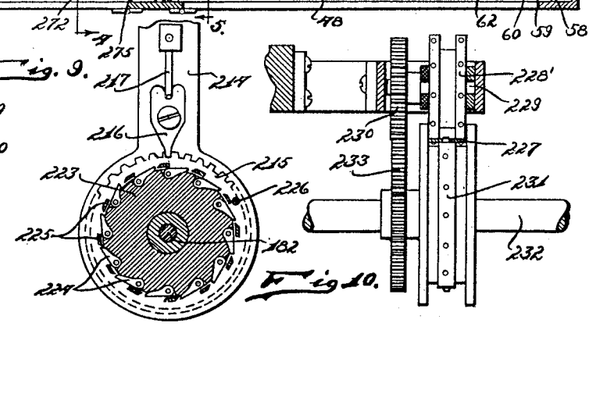
Fig. 9 is a sectional view taken on line 9—9 of Fig. 8.
Fig. 10 is a sectional view taken on line 10—10 of Fig. 7.

As will be noted in Figs. 11 and 14, when the dogs 133 engage the ratchet wheel 129, the ratchet wheel 130 will ride free of its dog 133′, this being caused by the shield 138 moving the dog 133 out of engagement with the ratchet wheel 130. Mounted on the shaft 182 is a gear 205 which connects by a belt 206 to a gear 207 mounted on a shaft 208. The gear 209 mounted on the shaft 208 is driven by the worm gear 210 which is mounted on the shaft 412 which is rotated from the shaft 111 by worm gears 410. The gear 205 is connected by a clutch mechanism detailed in Fig. 8 and is similar in construction to the clutch carrying the gear 207 except that the sleeve 410 is fixedly mounted on the shaft 182 while in the lower clutch 410 is freely mounted on the shaft 208. The object of this is that when the band 227 is wound on the spool 219 then the clutch will disengage to permit the spool 219' to ride freely and permit the unwinding of this band 227. This operation is accomplished as will be noted in Fig. 9, by the bosses 225 mounted on the gear 215 moving against the dogs 224, thus raising them sufficiently so that the pin 226 will engage against the underside of the dog 224 and lock the spool 219 with the gear 205.

The slots 228 and 229 and the band 227 engage between the sprockets 228' and 227. When the slots terminate the teeth on the sprockets 231 will be moved sufficiently so that the rotation of the shaft 230 will move the sprocket 238 thus rocking the plate 239 and moving the pin 306 inwardly so that it will engage and lift the pin 305 upwardly.

On the upward movement of the pin 305 it will engage against the pin 311 mounted on the boss 312 which is pivotally connected on the gear 381. The pin 311 projects through the slot in the gear 281 and locks against the boss 314 on the gear 280 which will cause the gear 280 to travel with the gear 281.

The gear 280 will mesh with the gear 246 and 250 and the gear 250 will cause a rotation of the gear 160'. The mechanism connected to the gear 160' is similar to the one explained, and operated and connected to the gear 160 except that this mechanism drives the spools 267, 268, 271 and 271'.

Unwinding the apron 264 on the spool 270 is a band 260 which travels over the sprocket gear 261 and winds on the spool 269. The object of this is to keep the apron 264 tightly on the spools 267 and 271. Sprockets 261 and 259 are driven by the gears 254 and 257 meshing with the gears 253 and 256 mounted on the shaft 248 which is driven through the gears 227 and 246.

When the motor is set in reversed action, the reversed motion of the gears will cause a reversed traveling of the gear 160 which will mesh with the gear 169 causing through the gear 164 a rocking of the sector 165. This will cause the pin 147 traveling in the slot 146 in the plate 143 to move upwardly rocking the shield 138 so that the dogs 133 will engage with the ratchet 129' and the dogs 133 to move out of engagement with the ratchet 129 through the operation of the shield 138. This reversed motion will enable the spool 54 to unwind and the spool 66 to wind.

The reverse action on the mechanism of the gear 160' will be similar to that described for 160. As noted in Fig. 1, substantially one-third of the front of the apron 264 is not visible because of the shield 81. When the spools have reversed their action, the boss 80 will thread on the spiral 78 moving the shield 81 upwardly into another position. Located on the band 227 are holes 430. These holes will be set certain distances apart as will be determined by the divisions on the apron 264 and these divisions on the apron 264 will be marked on the disk 237. When the holes engage in the sprockets 231, it will cause the meshing of the gears 230, 233 and 234. Eccentrically mounted on the gear 234 is a rod 235 pivoted at the point 440 and connected to a crank 236 which is connected to the disk 237. The rotation of the disk 237 will indicate to the operator that the apron 264 has moved to a different division, indicating another route used by a street car or a bus.

To summarize, therefore, when the motor 87 is operated and the mechanism operatively connected thereto through the intermittent mechanism involving the dogs and the rockable actuating mechanism described, the rollers 265 and 266, and 269 and 270, will be intermittently rotated in one direction, this direction depending upon the direction of operation of the motor. At the same time, through the same type of intermittent mechanism, the rollers 61', 68', 54 and 66, will be intermittently rotated, their direction being also determined by the direction of operation of the motor. This will bring the aprons 264 and 62 and 53 to travel intermittently across the space in the housing at which they will be visible. Upon operation of the motor the shield 81 will be moved either to the top of the housing or the bottom of the housing depending upon the direction of travel of the motor 87 so that of the apron or visible member 264 there will be visible two sections, corresponding to the opening 76 or 77, or corresponding to the opening 75 or 76 depending upon the direction of rotation of the apron 264. The display matter which is on the apron 264 is intended to be the names of streets or stops on the route over which a vehicle is being driven and its is intended that two of these sections or stop names be displayed simultaneously, the immediate stop being displayed at the opening 76 and the succeeding stop being displayed at the opening 77 or the opening 75 depending upon whether the apron 264 is travelling upwardly or downwardly of the face of the housing.

As the vehicle travels from one stop to the next succeeding one, it is necesssary that the flexible aprons 264 pause so that the information displayed thereon may be read by the passengers. The length of this pause is determined by the length of the slots 228 formed in the flexible band 227. When the end of the slot 228 engages the pin 227 on the wheel 231, the shaft 232 is rotated and this actuates through the clutch mechanism, which is clearly shown in Figs. 18 and 19, so that the required alternate slippage and driving of the flexible member may be effected. This alternate slippage and driving effects only the gear 160' so that the flexible members 264 alternately start and stop, whereas the flexible members 53 and 62 move continuously. When the shaft 232 rotates, the bell 204 will be rung to attract the attention of those who may be observing or may be desirous of observing the flexible member 264.

While I have illustrated and described the preferred form of construction, I do not wish to limit myself to the precise details of structure shown, but desire to avail myself of such variations and modifications as come within the scope of the appended claims.

Having thus described my invention what I claim as new and desire to secure by Letters Patent is:—

1. In a device of the class described, a housing; a flexible display member movable across one side of said housing, said side of said housing being open; a shield for covering a portion of said side of said housing; and screw operated means for moving said shield to various positions relatively to said side of said housing for concealing from view a portion of said display member moving across said side of said housing.

2. A device of the class described comprising a housing having an open side; a pair of vertically extending screws extending at the opposite sides of said housing; a shield partially closing said side of said housing; a nut in each of said screws attached to said shield; and means for rotating said screws in unison with each other.

3. A device of the class described comprising a housing having an open side; a pair of vertically extending screws extending at the opposite side of said side of said housing; a shield partially closing said side of said housing; a nut in each of said screws attached to said shield; means for rotating said screws in unison with each other and means for controlling operation of said rotating means.

In testimony whereof I have signed the foregoing specification.

PETER BOROWSKY.